US012294156B2

(12) United States Patent
Lin et al.

(10) Patent No.: US 12,294,156 B2
(45) Date of Patent: May 6, 2025

(54) ANTENNA DEVICE

(71) Applicants: INVENTEC (PUDONG) TECHNOLOGY CORPORATION, Shanghai (CN); INVENTEC CORPORATION, Taipei (TW)

(72) Inventors: Hsin-Hung Lin, Taipei (TW); Yu Shu Tai, Taipei (TW); Wei-Chen Cheng, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 221 days.

(21) Appl. No.: 18/205,817

(22) Filed: Jun. 5, 2023

(65) Prior Publication Data

US 2024/0313419 A1 Sep. 19, 2024

(30) Foreign Application Priority Data

Mar. 13, 2023 (CN) ......................... 202310239276.4

(51) Int. Cl.

| | |
|---|---|
| ***H01Q 21/28*** | (2006.01) |
| ***H01Q 1/48*** | (2006.01) |
| ***H01Q 1/52*** | (2006.01) |
| ***H01Q 5/378*** | (2015.01) |
| ***H01Q 9/42*** | (2006.01) |

(52) U.S. Cl.

CPC ............... *H01Q 21/28* (2013.01); *H01Q 1/48* (2013.01); *H01Q 1/521* (2013.01); *H01Q 5/378* (2015.01); *H01Q 9/42* (2013.01)

(58) Field of Classification Search

CPC ............ H01Q 1/38; H01Q 1/48; H01Q 1/521; H01Q 5/378; H01Q 5/385; H01Q 5/392; H01Q 9/42; H01Q 21/24; H01Q 21/26; H01Q 21/28

See application file for complete search history.

(56) References Cited

U.S. PATENT DOCUMENTS

2017/0194720 A1* 7/2017 Duan ................ H01Q 15/0086

FOREIGN PATENT DOCUMENTS

CN 111430919 A1 * 7/2020
KR 10-2012-0035459 * 4/2012

* cited by examiner

*Primary Examiner* — Robert Karacsony
(74) *Attorney, Agent, or Firm* — Maschoff Brennan

(57) ABSTRACT

An antenna device includes a substrate and four antenna units. The four antenna units are disposed on the substrate. Each of the four antenna units includes an L-shaped radiation portion, a hook-shaped coupling portion and a ground portion. The hook-shaped coupling portion is adjacent to the L-shaped radiation portion. The ground portion is disposed around the L-shaped radiation portion and the hook-shaped coupling portion. One end of the hook-shaped coupling portion is connected to the ground portion.

10 Claims, 4 Drawing Sheets

ANTENNA DEVICE

CROSS-REFERENCE TO RELATED APPLICATIONS

This non-provisional application claims priority under 35 U.S.C. § 119(a) on Patent Application No(s). 202310239276.4 filed in China, on Mar. 13, 2023, the entire contents of which are hereby incorporated by reference.

BACKGROUND OF THE INVENTION

Technical Field of the Invention

The invention relates to an antenna device, more particularly to a four-receiving four-transmitting antenna device.

Description of the Related Art

With the advancement of wireless communication technology, electronic devices such as mobile phones and personal digital assistants have various functions and improved performance, and become lighter and thinner. In particular, the wireless communication technology will enter 6G era in 2030 and satisfy various requirements for life applications and business that 5G cannot meet.

In order to achieve various functions of an electronic device, manufacturers may install more electronic components in the electronic device to meet the needs of users. Since the space for accommodating antennas in the electronic device is limited, manufacturers may reduce the size of the antennas or increase the arrangement density of the antennas so that the antennas can be accommodated in the limited space. However, reducing the size of the antennas or increasing the density of the antennas may deteriorated the isolation between the antennas, which increases the signal interference between the antennas and the return loss of the antennas, thereby narrowing the frequency bandwidth of the antennas. Therefore, a technical solution should be provided for addressing the aforementioned issues.

SUMMARY OF THE INVENTION

The invention provides an antenna device so as to reduce the signal interference therebetween and the return loss thereof, thereby maintaining the wide bandwidth of the antennas.

One embodiment of the invention provides an antenna device including a substrate and four antenna units. The four antenna units are disposed on the substrate. Each of the four antenna units includes an L-shaped radiation portion, a hook-shaped coupling portion and a ground portion. The hook-shaped coupling portion is adjacent to the L-shaped radiation portion. The ground portion is disposed around the L-shaped radiation portion and the hook-shaped coupling portion. One end of the hook-shaped coupling portion is connected to the ground portion.

According to the antenna device disclosed by above embodiments, since the four antenna units are arranged in an array on the substrate, and the arrangement directions of the any two adjacent antenna units form an angle of 90 degrees, the isolation between the four antenna units and the return loss of the four antenna units can be lowered. Accordingly, even though the four antenna units are densely arranged, the signal interference between the four antenna units can be reduced. Thus, the volume of the antenna device is allowed to be reduced while maintaining the wide bandwidth of the 6G frequency band, the n77 frequency band and the n78 frequency band in the 5G frequency band and the WIFI-6E frequency band, low isolation and low return loss.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
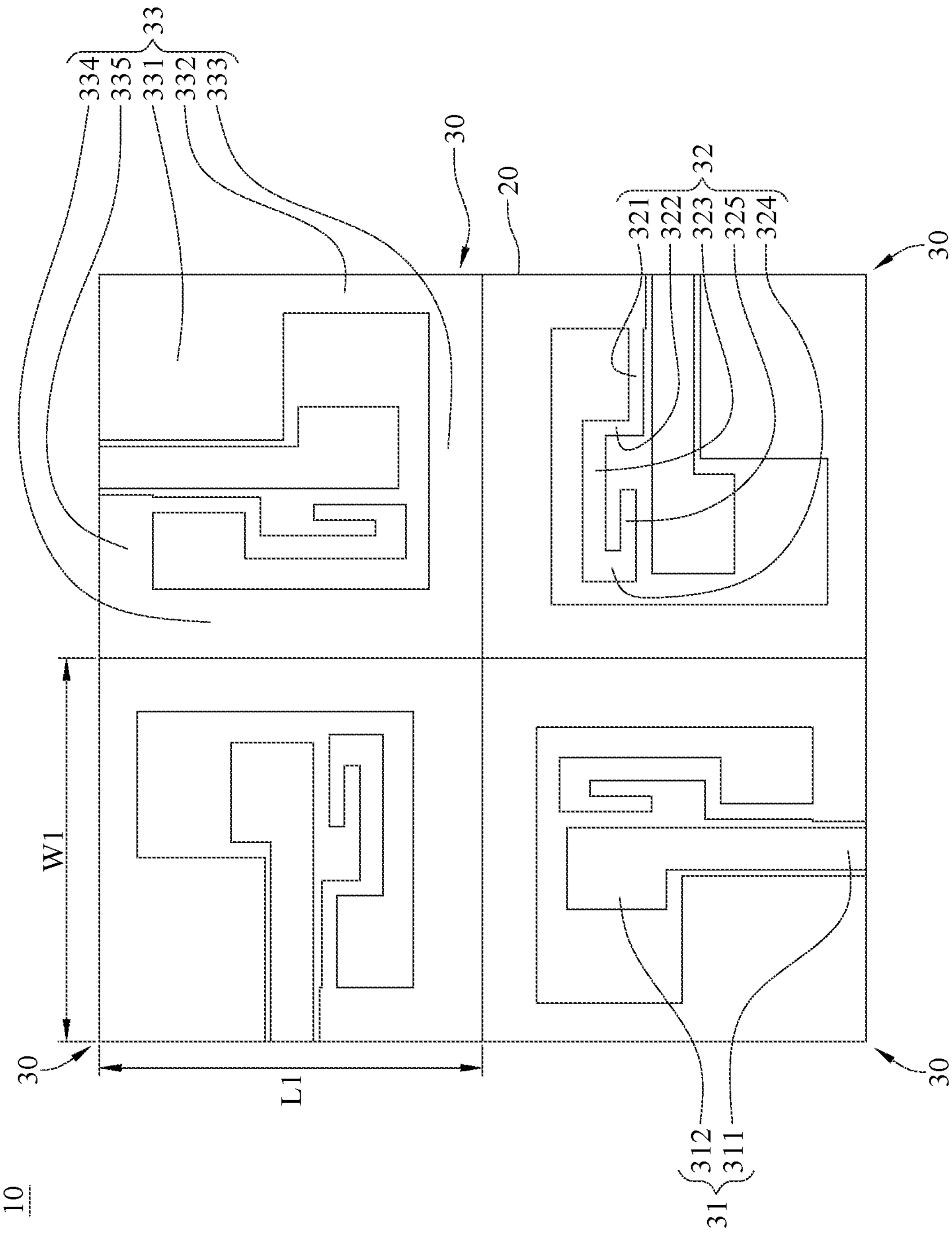
FIG. 1 is a plane view of an antenna device in accordance with a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
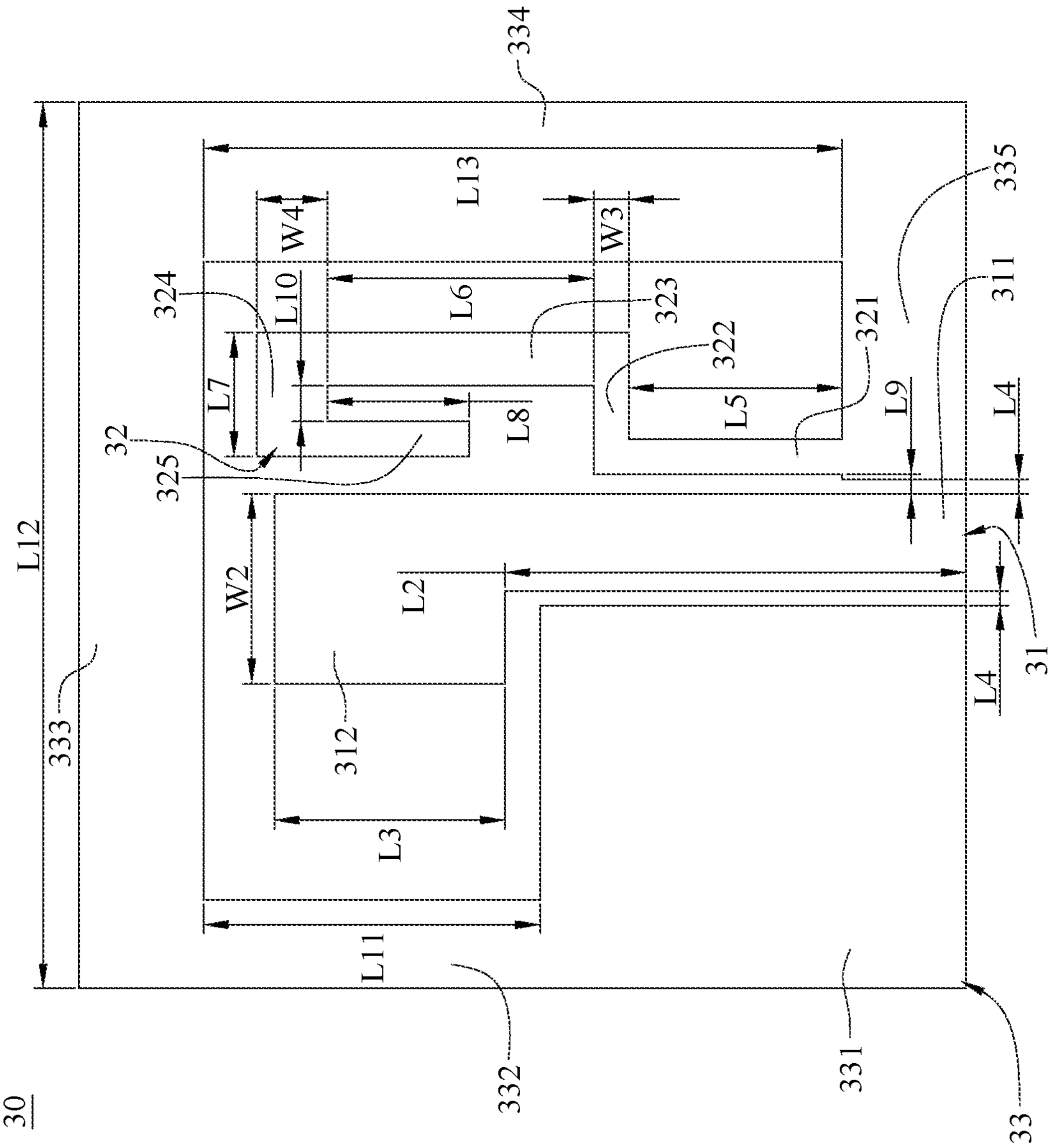
FIG. 2 is a plane view of one of antenna units of the antenna device in FIG. 1.

Please refer to FIG. 1 and FIG. 2, where FIG. 1 is a plane view of an antenna device 10 in accordance with a first embodiment of the invention, and FIG. 2 is a plane view of one of antenna units 30 of the antenna device 10 in FIG. 1.

In this embodiment, the antenna device 10 includes a substrate 20 and four antenna units 30. The substrate 20 is, for example, made of glass fiber material. A dielectric constant of the substrate 20 is, for example, 4.4, and the loss tangent of the substrate 20 is, for example, 0.0035. The four antenna units 30 are disposed on the substrate 20, and are arranged in, for example, a 2×2 array. Arrangement directions of any two adjacent antenna units 30 form an angle of 90 degrees. That is, the arrangement direction of the antenna unit 30 located at the upper-right corner of the substrate 20 is the antenna unit 30 located at the upper-left corner of the substrate 20 that is rotated 90 degrees clockwise. The arrangement direction of the antenna unit 30 located at the lower-right corner of the substrate 20 is the antenna unit 30 located at the upper-left corner of the substrate 20 that is rotated 180 degrees clockwise. The arrangement direction of the antenna unit 30 located at the lower-left corner of the substrate 20 is the antenna unit 30 located at the upper-left corner of the substrate 20 that is rotated 270 degrees clockwise.

Each of the four antenna units 30 includes an L-shaped radiation portion 31, a hook-shaped coupling portion 32 and a ground portion 33. The L-shaped radiation portion 31 includes a first radiation part 311 and a second radiation part 312. The first radiation part 311 is connected to the second radiation part 312 and is perpendicular to the second radiation part 312. Two opposite sides of the first radiation part 311 are spaced apart from the ground portion 33. In addition, one end of the first radiation part 311 located farthest away from the second radiation part 312 has a feeding point. That is, the antenna device 10 of the present invention is a four-receiving four-transmitting antenna device.

In this embodiment, the isolation between the four antenna units 30 can be lowered via arrangement directions of any two adjacent antenna units 30 forming an angle of 90 degrees. That is, the signal interference between the four antenna units 30 when transmitting signals can be reduced.

In this embodiment, a length L1 and a width W1 of each of the four antenna units 30 both are 25 millimeters (mm). A length L2 of the first radiation part 311 is 13 mm. A length L3 of the second radiation part 312 is 6.5 mm. A width W2 of the second radiation part 312 is 5.35 mm. Two distances L4 between the two opposite sides of the first radiation part 311 and the ground portion 33 are 0.4 mm.

The hook-shaped coupling portion 32 is adjacent to the L-shaped radiation portion 31. The hook-shaped coupling portion 32 includes a first coupling part 321, a second coupling part 322, a third coupling part 323, a fourth coupling part 324 and a fifth coupling part 325. One end of the first coupling part 321 is connected to the ground portion 33. Another end of the first coupling part 321 is connected to one end of the second coupling part 322. The second coupling part 322 is perpendicular to the first coupling part 321 and is located farther away from the L-shaped radiation portion 31. Another end of the second coupling part 322 is connected to one end of the third coupling part 323. The third coupling part 323 is perpendicular to the second coupling part 322 and is located farther away from the first coupling part 321. Another end of the third coupling part 323 is connected to one end of the fourth coupling part 324. The fourth coupling part 324 is perpendicular to the third coupling part 323 and extends toward the L-shaped radiation portion 31. Another end of the fourth coupling part 324 is connected to one end of the fifth coupling part 325. The fifth coupling part 325 is perpendicular to the fourth coupling part 324 and extends toward the first coupling part 321.

In this embodiment, a length L5 of the first coupling part 321 is 6 mm. A width W3 of the second coupling part 322 is 1 mm. A length L6 of the third coupling part 323 is 7.5 mm. A length L7 of the fourth coupling part 324 is 3.5 mm. A width W4 of the fourth coupling part 324 is 2 mm. A length L8 of the fifth coupling part 325 is 4 mm. A distance L9 between the first coupling part 321 and the first radiation part 311 of the L-shaped radiation portion 31 is 0.55 mm. A distance L10 between the third coupling part 323 and the fifth coupling part 325 is 1 mm.

The ground portion 33 is disposed around the L-shaped radiation portion 31 and the hook-shaped coupling portion 32, and one end of the hook-shaped coupling portion 32 is connected to the ground portion 33. The ground portion 33 includes a first ground part 331, a second ground part 332, a third ground part 333, a fourth ground part 334 and a fifth ground part 335. One end of the first ground part 331 is connected to one end of the second ground part 332. The second ground part 332 is perpendicular to the first ground part 331. Another end of the second ground part 332 is connected to one end of the third ground part 333. The third ground part 333 is perpendicular to the second ground part 332. Another end of the third ground part 333 is connected to one end of the fourth ground part 334. The fourth ground part 334 is perpendicular to the third ground part 333. Another end of the fourth ground part 334 is connected to one end of the fifth ground part 335. The fifth ground part 335 is perpendicular to the fourth ground part 334. Another end of the fifth ground part 335 is connected to one end of the hook-shaped coupling portion 32. The fifth ground part 335 is perpendicular to the hook-shaped coupling portion 32. The first ground part 331 is spaced apart from the fifth ground part 335. The L-shaped radiation portion 31 is disposed between the first ground part 331 and the fifth ground part 335.

In this embodiment, a length L11 of the second ground part 332 is 9.5 mm. A length L12 of the third ground part 333 is 25 mm. A length L13 of the fourth ground part 334 is 18 mm.

Figure 3:
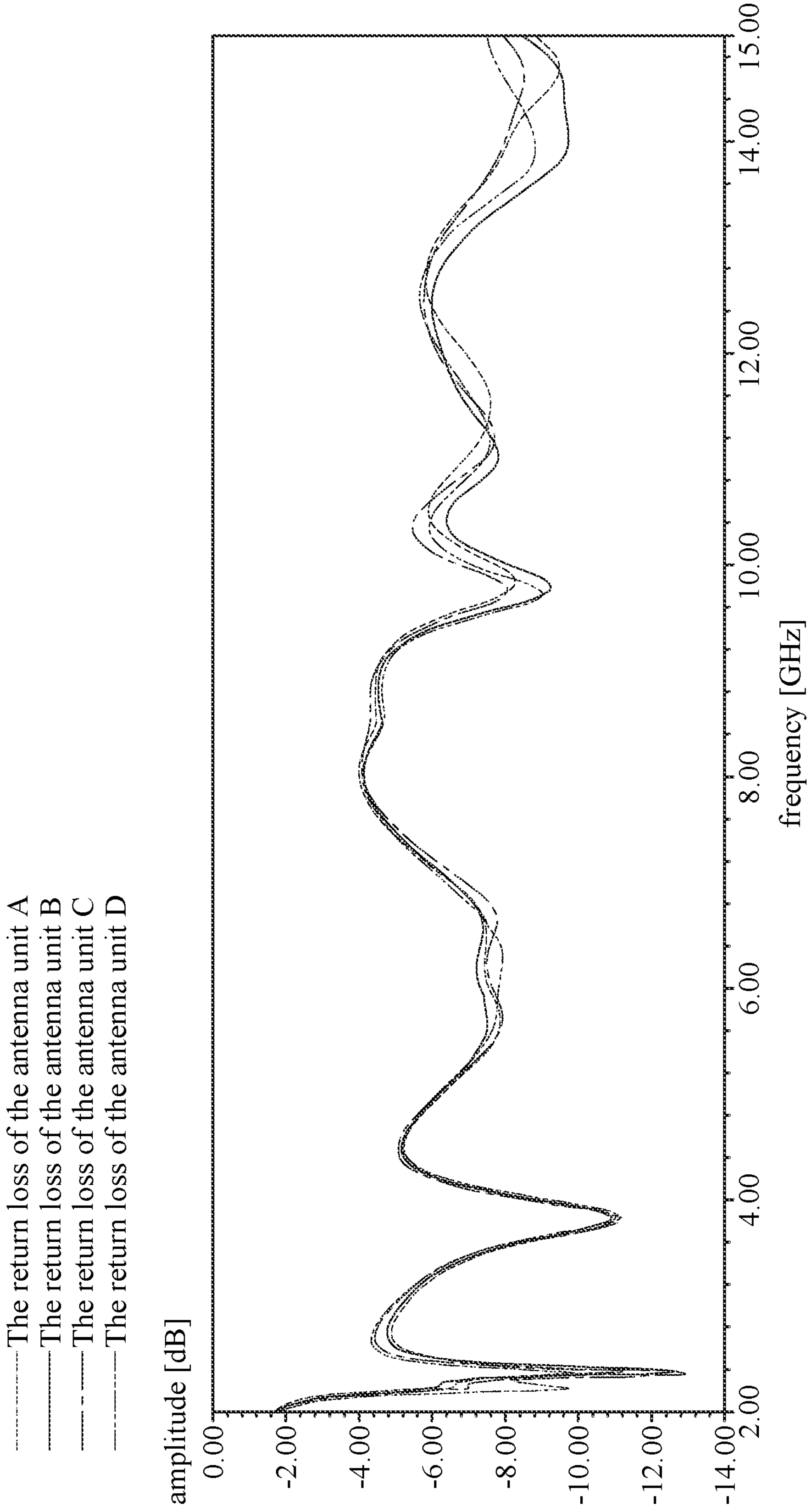
FIG. 3 is line chart showing return loss of each of the antenna units.

Please refer to FIG. 3, which is line chart showing return loss of each of the antenna units 30. In the 6G frequency band (ranging from 10.7 GHZ to 14.5 GHZ) or n77 frequency band (ranging from 3.3 GHZ to 4.2 GHz) and n78 frequency band (ranging from 3.3 GHz to 3.8 GHZ) in the 5G frequency band, the return loss of the antenna device 10 of the present invention only in a few frequency bands is slightly higher than-6 dB, while the return loss of the antenna device 10 of the present invention in the rest of the aforementioned frequency bands is lower than-6 dB. In high frequency band (ranging from 5.15 GHz to 7.125 GHZ) of WIFI-6E, the return loss of the antenna device 10 of the present invention is lower than −10 dB. That is, in the four-receiving four-transmitting antenna device 10, the arrangement directions of any two adjacent antenna units 30 of forming an angle of 90 degrees can reduce the return loss.

Figure 4:
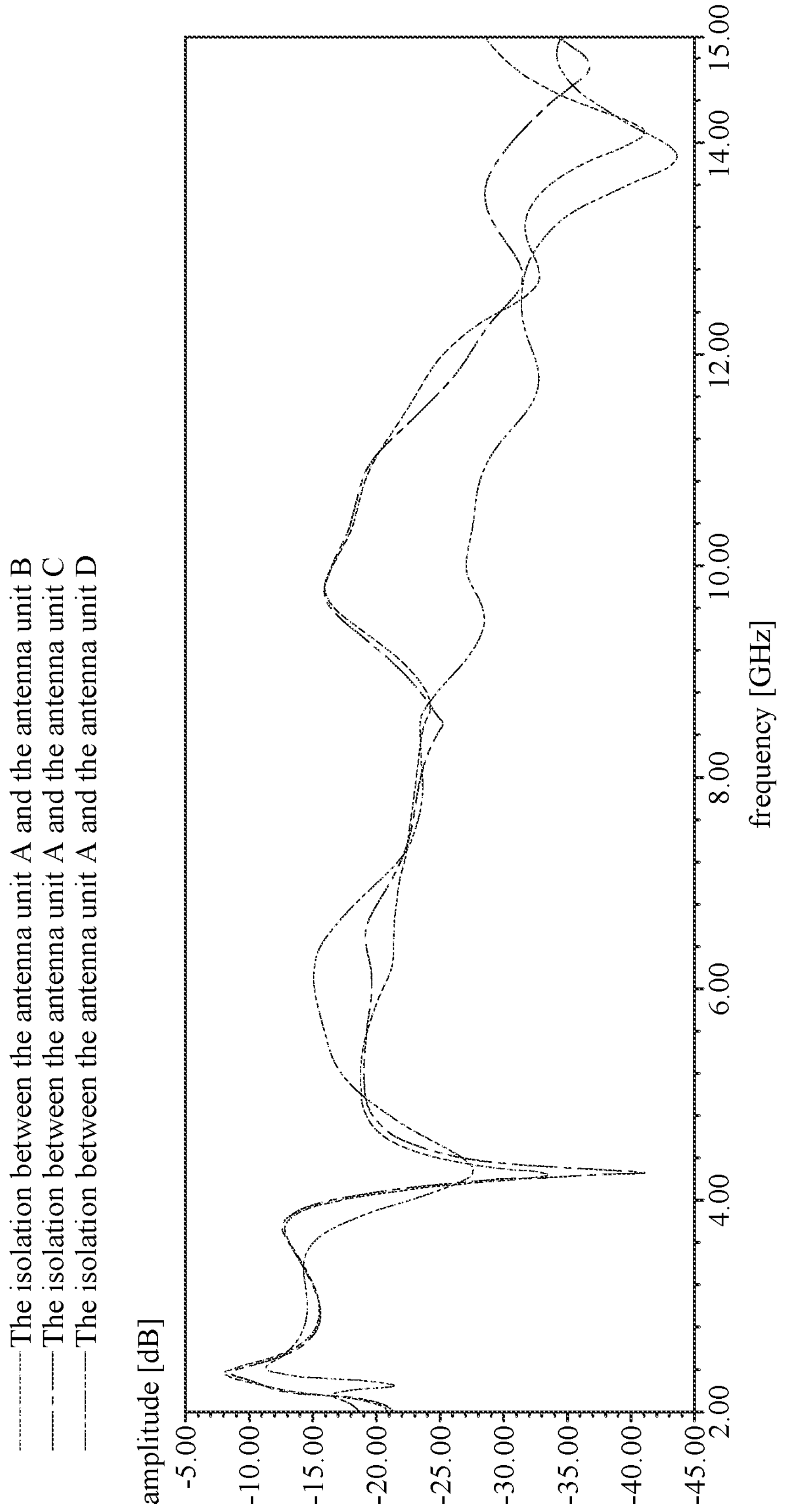
FIG. 4 is line chart showing isolation between the antenna units.

Please refer to FIG. 4, which is line chart showing isolation between the antenna units 30. In low frequency band (ranging from 2.4 GHz to 2.5 GHZ) of WIFI-6E, the isolation between the antenna unit 30A located at the upper-left corner of the substrate 20 and the antenna unit 30B located at the upper-right corner of the substrate 20, the isolation between the antenna unit 30A located at the upper-left corner of the substrate 20 and the antenna unit 30C located at the lower-left corner of the substrate 20, and the isolation between the antenna unit 30A located at the upper-left corner of the substrate 20 and the antenna unit 30D located at the lower-right corner of the substrate 20 are all lower than-8 dB. In the 6G frequency band, n77 frequency band and n78 frequency band in the 5G frequency band or the high frequency band of WIFI-6E, the isolation between the antenna unit 30A and the antenna unit 30B, the isolation between the antenna unit 30A and the antenna unit 30C, and the isolation the antenna unit 30A and the antenna unit 30D only in a few frequency bands are slightly higher than-15 dB, and the isolation of the antenna device 10 of the present invention in the rest of the aforementioned frequency bands is lower than-6 dB. That is, in the four-receiving four-transmitting antenna device 10, the arrangement directions of any two adjacent antenna units 30 of forming an angle of 90 degrees can reduce the isolation.

According to the antenna device disclosed by above embodiments, since the four antenna units are arranged in an array on the substrate, and the arrangement directions of any two adjacent antenna units form an angle of 90 degrees, the isolation among the four antenna units and the return loss of the four antenna units can be reduced. Accordingly, even though the four antenna units are densely arranged, the signal interference among the four antenna units can be reduced. Thus, the size of the antenna device is allowed to be reduced while maintaining the wide bandwidth of the 6G frequency band, n77 frequency band and n78 frequency band in the 5G frequency band and the WIFI-6E frequency band, low isolation and low return loss.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. An antenna device, comprising:
a substrate; and
four antenna units, disposed on the substrate, wherein each of the four antenna units comprises:
an L-shaped radiation portion;
a hook-shaped coupling portion, adjacent to the L-shaped radiation portion; and
a ground portion, disposed around the L-shaped radiation portion and the hook-shaped coupling portion, wherein one end of the hook-shaped coupling portion is connected to the ground portion.

2. The antenna device according to claim 1, wherein the L-shaped radiation portion comprises a first radiation part and a second radiation part, the first radiation part is connected to the second radiation part and is perpendicular to the second radiation part, and one end of the first radiation part located farthest away from the second radiation part has a feeding point.

3. The antenna device according to claim 2, wherein two opposite sides of the first radiation part are spaced apart from the ground portion.

4. The antenna device according to claim 3, wherein a length and a width of each of the four antenna units both are 25 millimeters, a length of the first radiation part is 13 millimeters, a length of the second radiation part is 6.5 millimeters, a width of the second radiation part is 5.35 millimeters, and two distances between the two opposite sides of the first radiation part and the ground portion are 0.4 millimeters.

5. The antenna device according to claim 1, wherein the hook-shaped coupling portion comprises a first coupling part, a second coupling part, a third coupling part, a fourth coupling part and a fifth coupling part, one end of the first coupling part is connected to the ground portion, another end of the first coupling part is connected to one end of the second coupling part, the second coupling part is perpendicular to the first coupling part and located farther away from the L-shaped radiation portion, another end of the second coupling part is connected to one end of the third coupling part, the third coupling part is perpendicular to the second coupling part and located farther away from the first coupling part, another end of the third coupling part is connected to one end of the fourth coupling part, the fourth coupling part is perpendicular to the third coupling part and extends toward the L-shaped radiation portion, and another end of the fourth coupling part is connected to one end of the fifth coupling part, the fifth coupling part is perpendicular to the fourth coupling part and extends toward the first coupling part.

6. The antenna device according to claim 5, wherein a length of the first coupling part is 6 millimeters, a width of the second coupling part is 1 millimeters, a length of the third coupling part is 7.5 millimeters, a length of the fourth coupling part is 3.5 millimeters, a width of the fourth coupling part is 2 millimeters, a length of the fifth coupling part is 4 millimeters, a distance between the first coupling part and the L-shaped radiation portion is 0.55 millimeters, and a distance between the third coupling part and the fifth coupling part is 1 millimeters.

7. The antenna device according to claim 1, wherein the ground portion comprises a first ground part, a second ground part, a third ground part, a fourth ground part and a fifth ground part, one end of the first ground part is connected to one end of the second ground part, the second ground part is perpendicular to the first ground part, another end of the second ground part is connected to one end of the third ground part, the third ground part is perpendicular to the second ground part, another end of the third ground part is connected to one end of the fourth ground part, the fourth ground part is perpendicular to the third ground part, another end of the fourth ground part is connected to one end of the fifth ground part, the fifth ground part is perpendicular to the fourth ground part, another end of the fifth ground part is connected to one end of the hook-shaped coupling portion, the fifth ground part is perpendicular to the hook-shaped coupling portion, the first ground part is spaced apart from the fifth ground part, and the L-shaped radiation portion is disposed between the first ground part and the fifth ground part.

8. The antenna device according to claim 7, wherein a length of the second ground part is 9.5 millimeters, a length of the third ground part is 25 millimeters, and a length of the fourth ground part is 18 millimeters.

9. The antenna device according to claim 1, wherein the four antenna units are arranged in an array, and arrangement directions of any adjacent two of the four antenna units form an angle of 90 degrees.

10. The antenna device according to claim 1, wherein the substrate is made of glass fiber material.

* * * * *